(12) United States Patent
Pavuk et al.

(10) Patent No.: US 8,641,051 B2
(45) Date of Patent: Feb. 4, 2014

(54) VEHICLE SUSPENSION SYSTEM AND A METHOD OF CONTROL

(75) Inventors: Gregory D. Pavuk, Berkley, MI (US); Edwin D. Lorenz, Grand Blanc, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/372,643

(22) Filed: Feb. 14, 2012

(65) Prior Publication Data

US 2013/0207355 A1    Aug. 15, 2013

(51) Int. Cl.
*F16F 9/08* (2006.01)

(52) U.S. Cl.
USPC .......... 280/5.514; 280/5.515; 280/6.157; 280/124.157; 280/124.16; 267/64.21; 267/64.24; 267/64.27; 188/275; 188/313; 188/318

(58) Field of Classification Search
USPC .............. 280/124.157, 124.16, 5.512, 5.514, 280/6.157, 124.145, 124.146, 124.154, 280/124.159, 5.515; 267/64.21, 64.27, 267/64.19, 64.23, 64.24; 188/266, 275, 188/301, 313, 318, 322.13, 322.17, 322.18
See application file for complete search history.

(56) References Cited

U.S. PATENT DOCUMENTS

| | | | | |
|---|---|---|---|---|
| 3,558,153 A | * | 1/1971 | Strauff | 280/124.159 |
| 3,904,183 A | * | 9/1975 | Allinquant et al. | 267/64.17 |
| 4,445,673 A | * | 5/1984 | Clark | 267/64.24 |
| 4,588,171 A | | 5/1986 | Stephens | |
| 4,890,822 A | * | 1/1990 | Ezure et al. | 267/64.23 |
| 6,374,966 B1 | * | 4/2002 | Lillbacka | 188/266 |
| 6,454,248 B2 | * | 9/2002 | Pradel | 267/64.24 |
| 6,695,294 B2 | * | 2/2004 | Miller et al. | 267/64.16 |
| 7,070,028 B2 | * | 7/2006 | Reybrouck et al. | 188/313 |
| 7,128,192 B2 | * | 10/2006 | Fox | 188/275 |
| 7,156,382 B2 | * | 1/2007 | Lloyd | 267/64.28 |
| 7,866,681 B1 | | 1/2011 | Shahly et al. | |
| 2007/0126163 A1 | * | 6/2007 | Leonard et al. | 267/64.27 |
| 2010/0253018 A1 | * | 10/2010 | Peterson | 280/5.504 |
| 2010/0259018 A1 | * | 10/2010 | Honig et al. | 280/5.514 |

FOREIGN PATENT DOCUMENTS

| | | |
|---|---|---|
| EP | 0160277 A2 | 11/1985 |
| JP | 58122211 A | 7/1983 |
| WO | 2006 071 172 A1 | 7/2006 |

OTHER PUBLICATIONS

European Patent Office, Extended European Search Report for corresponding EP 13153595.7 dated May 8, 2013.

* cited by examiner

*Primary Examiner* — James English
(74) *Attorney, Agent, or Firm* — Brooks Kushman P.C.

(57) ABSTRACT

A vehicle suspension system and a method of control. The system may include an air cylinder, an air spring piston, and an air spring. The air spring piston may be positioned with respect to the air spring with the air cylinder.

21 Claims, 8 Drawing Sheets

VEHICLE SUSPENSION SYSTEM AND A METHOD OF CONTROL

TECHNICAL FIELD

The present application relates to a vehicle suspension system and a method of control.

BACKGROUND

A self-guided air spring assembly is disclosed in U.S. Pat. No. 7,866,681.

SUMMARY

In at least one embodiment, a vehicle suspension system is provided. The vehicle suspension system may include an air cylinder, an air spring piston, and an air spring. The air cylinder may have a housing assembly, a piston rod, and a piston. The housing assembly may at least partially define a cavity and may be configured to be mounted to a first vehicle component. The piston rod may have a first end disposed in the cavity and a second end disposed opposite the first end. The piston may be fixedly disposed on the piston rod and may separate the cavity into a first chamber and a second chamber. The first and second chambers may have first and second ports that permit air to enter and exit the first and second chambers, respectively. The air spring piston may be fixedly disposed on the air cylinder. The air spring piston may have an air passage that is fluidly connected to the second port. The air spring may have an end plate and a flexible bellows. The end plate may be configured to be mounted to a second vehicle component and may have an air spring port. The second end of the piston rod may be disposed proximate the end plate. The flexible bellows may extend from the end plate to the air spring piston to at least partially define an air spring chamber. The air spring port may permit air to enter and exit the air spring chamber. Air may be provided to the first chamber via the first port and exhausted from the second chamber via the second port and the air passage to increase a distance between the air spring piston and the end plate.

In at least one embodiment, a vehicle suspension system is provided. The vehicle suspension system may have an air cylinder, an air spring piston, and an air spring. The air cylinder may have a housing assembly, a piston, and a piston rod. The housing assembly may at least partially define a cavity and may be configured to be mounted to a first vehicle component. The piston may separate the cavity into a first chamber and a second chamber. The piston may be fixedly disposed on the piston rod. The piston rod may have a first end, a second end disposed opposite the first end, and a bore. The bore may extend from the first end to the second end to at least partially define a first port that is in fluid communication with the first chamber. A second port may be provided on the housing assembly and may be in fluid communication with the second chamber. The air spring piston may be fixedly disposed on the housing and may have an air passage that is fluidly connected to the second port. The air spring may have an end plate, a flexible bellows, and an air spring port. The end plate may be configured to be mounted to a second vehicle component and may engage the second end of the piston rod. The flexible bellows may extend from the end plate to the air spring piston to at least partially define an air spring chamber. The air spring port may be in fluid communication with the air spring chamber and a first port. Air may be provided to the first chamber by the first port and to the air spring chamber via the air spring port and air may be exhausted from the second chamber via the second port and the air passage to increase the distance between the air spring piston and the end plate.

In at least one embodiment, a method of controlling a vehicle suspension system is provided. The vehicle suspension system may have a first valve that is fluidly coupled to a first chamber of an air cylinder, an air spring piston that is fixedly disposed on the air cylinder, an air spring that is disposed on the air spring piston and that has a flexible bellows that at least partially defines an air spring chamber, and a second valve that is fluidly coupled to the air spring chamber. The method may include determining a desired ride mode and/or a desired ride height and determining a current ride height. The method may then compare the current ride height to the desired ride height. A first valve may be opened to provide air at a predetermined pressure to the air cylinder when an on-road ride mode is selected. A second valve may be actuated to exhaust air from the air spring until the desired ride height is attained when the current ride height is greater than the desired ride height.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
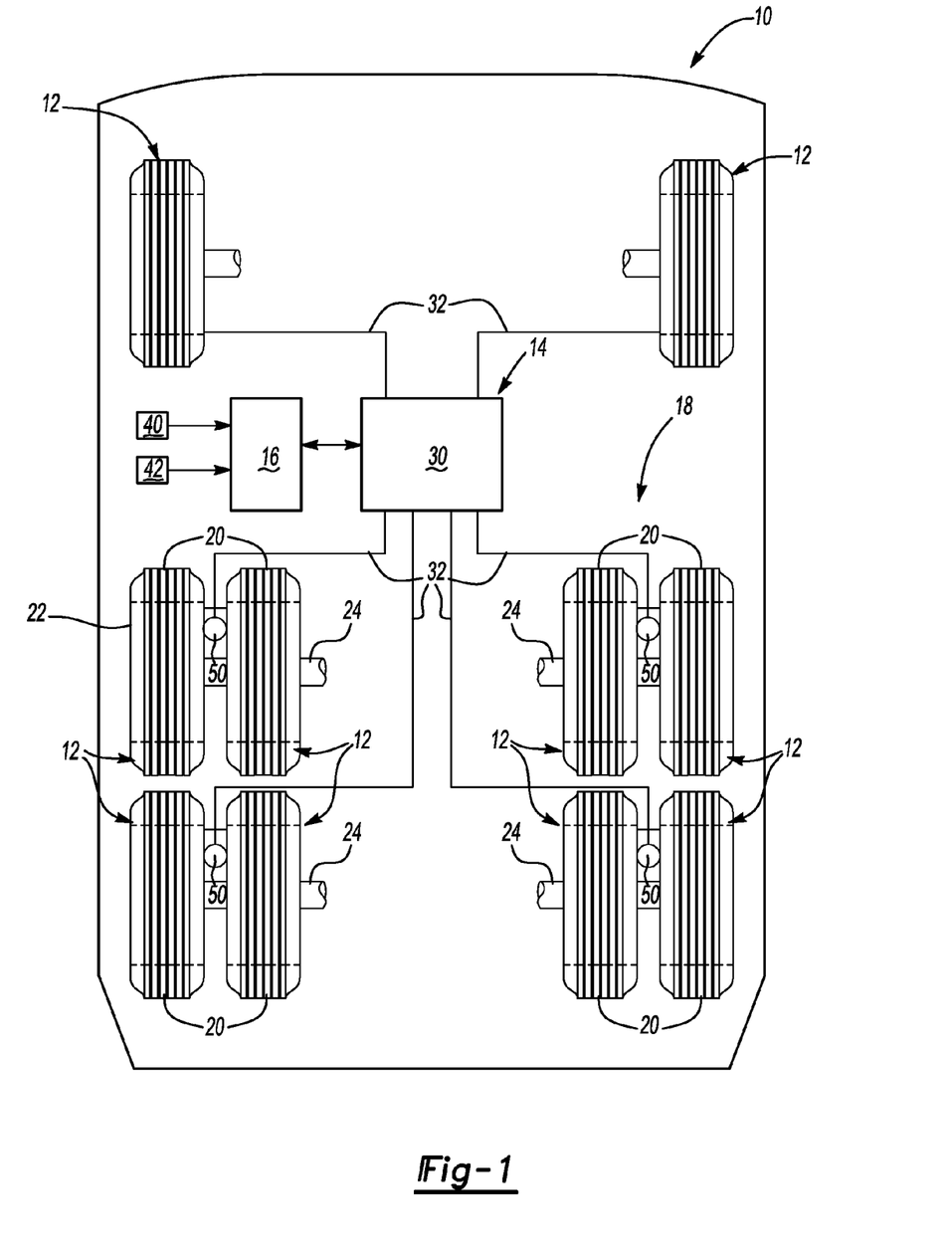
FIG. 1 is a schematic of an exemplary vehicle having a vehicle suspension system.

Referring to FIG. 1, an exemplary vehicle 10 is shown. The vehicle 10 may be of any suitable type, such as a motor vehicle like a truck, bus, farm equipment, military transport or weaponry vehicle, cargo loading equipment for land, air, or marine vessels or a trailer that may be provided with a motor vehicle. The vehicle 10 may include one or more wheel assemblies 12, a pressurized gas supply system 14, a control system 16, and a vehicle suspension system 18.

A wheel assembly 12 may include an inflatable tire 20 that may be mounted on an associated wheel 22 that may in turn be mounted on a wheel axle 24.

The pressurized gas supply system 14 and may provide a pressurized gas or pressurized gas mixture, such as air, to the vehicle suspension system 18. The term pressurized gas is used to generically reference a single gas or a gas mixture that may be pressurized above atmospheric pressure by the pressurized gas supply system 14. The pressurized gas supply system 14 may include a pressurized gas source 30, one or more conduits 32, and one or more valves.

The pressurized gas source 30 may include a tank or reservoir that contains a volume of pressurized gas and/or a pump or compressor that provides pressurized gas.

A conduit 32 may fluidly connect the pressurized gas source 30 to the vehicle suspension system 18. A conduit 32 may have any suitable configuration, such as a hose, tubing, pipe, or combinations thereof.

Figure 3:
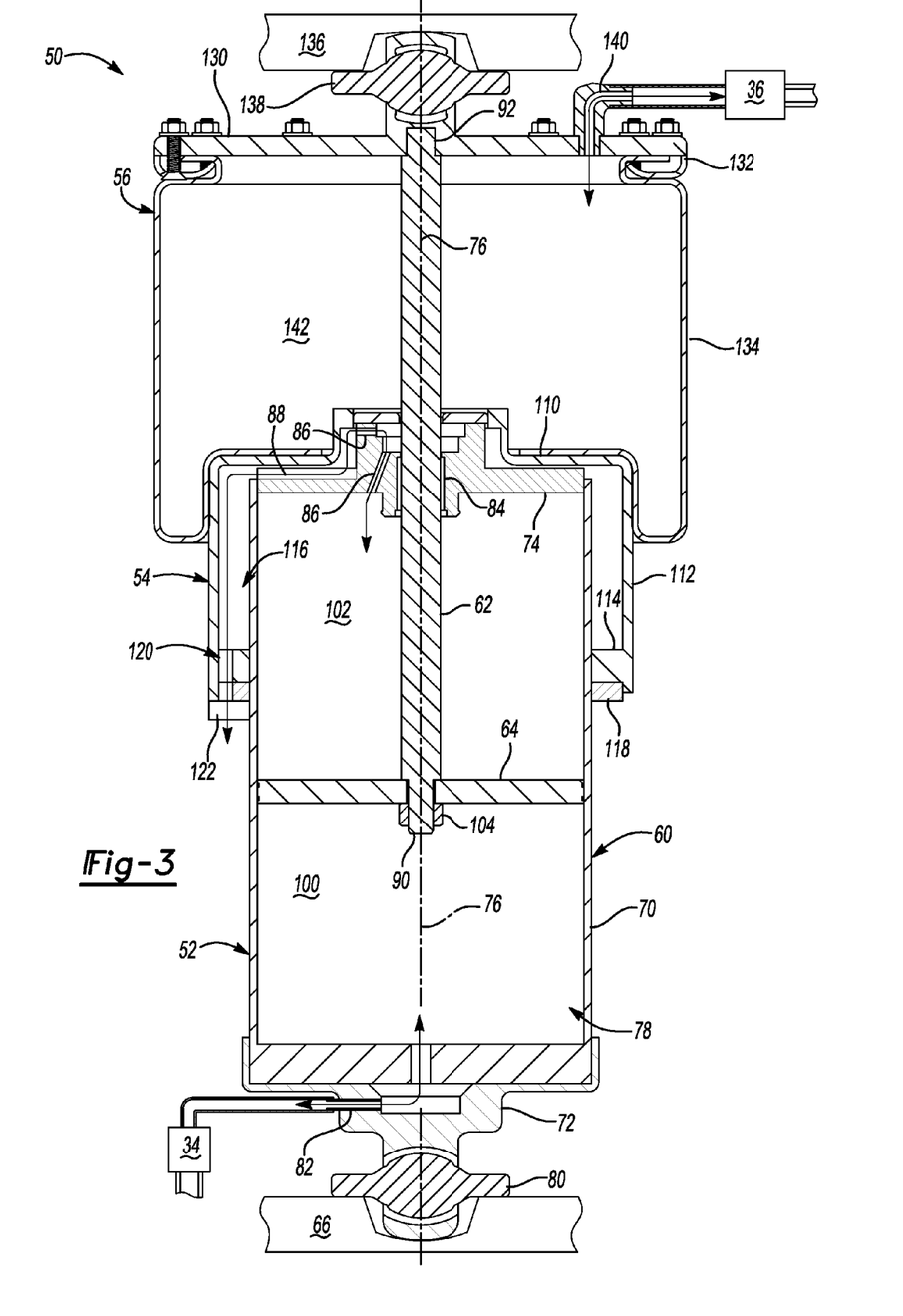
FIGS. 3-5 are section views of the air-air strut in first, second, and third positions, respectively.

One or more valves may be provided to control the flow of pressurized gas. For example, at least one valve may enable or disable the flow of pressurized gas from the pressurized gas source 30 to the vehicle suspension system 18. In addition, a valve may enable or disable venting or the exhaust of pressurized gas from the vehicle suspension system 18. A valve may have any suitable configuration and may be actuated in any suitable manner, such as with a solenoid. In FIG. 3, a first valve 34 and a second valve 36 are shown; however a single valve may be provided in one or more embodiments as will be discussed in more detail below.

Referring again to FIG. 1, the control system 16 may monitor and control operation of components and systems of the vehicle 10. The control system 16 may include at least one controller or control module that may monitor and/or control various components of the pressurized gas supply system 14 and/or the vehicle suspension system 18. For example, the control system 16 may be configured to control the operation of the first valve 34 and second valve 36, if provided, to control the flow of pressurized gas from the pressurized gas supply system 14 to the vehicle suspension system 18 and to control venting of pressurized gas from the vehicle suspension system 18. In addition, the control system 16 may communicate with various sensors or input devices. For instance, the control system 16 may be configured to receive a signal or data from at least one ride height sensor 40 that may be configured to detect or provide data indicative of the ride height of the vehicle 10, or position of the vehicle chassis with respect to the ground or a support surface. In addition, the control system 16 may communicate with a communication device 42 that may receive an input from and/or provide feedback to a vehicle operator. The communication device 42 may be of any suitable type, such as a switch, button, sensor, touchscreen, or the like. The communication device 42 may be used to allow the operator to select a desired vehicle ride height setting and/or select a desired vehicle ride mode setting that may be associated with particular suspension system performance characteristics.

Figure 2:
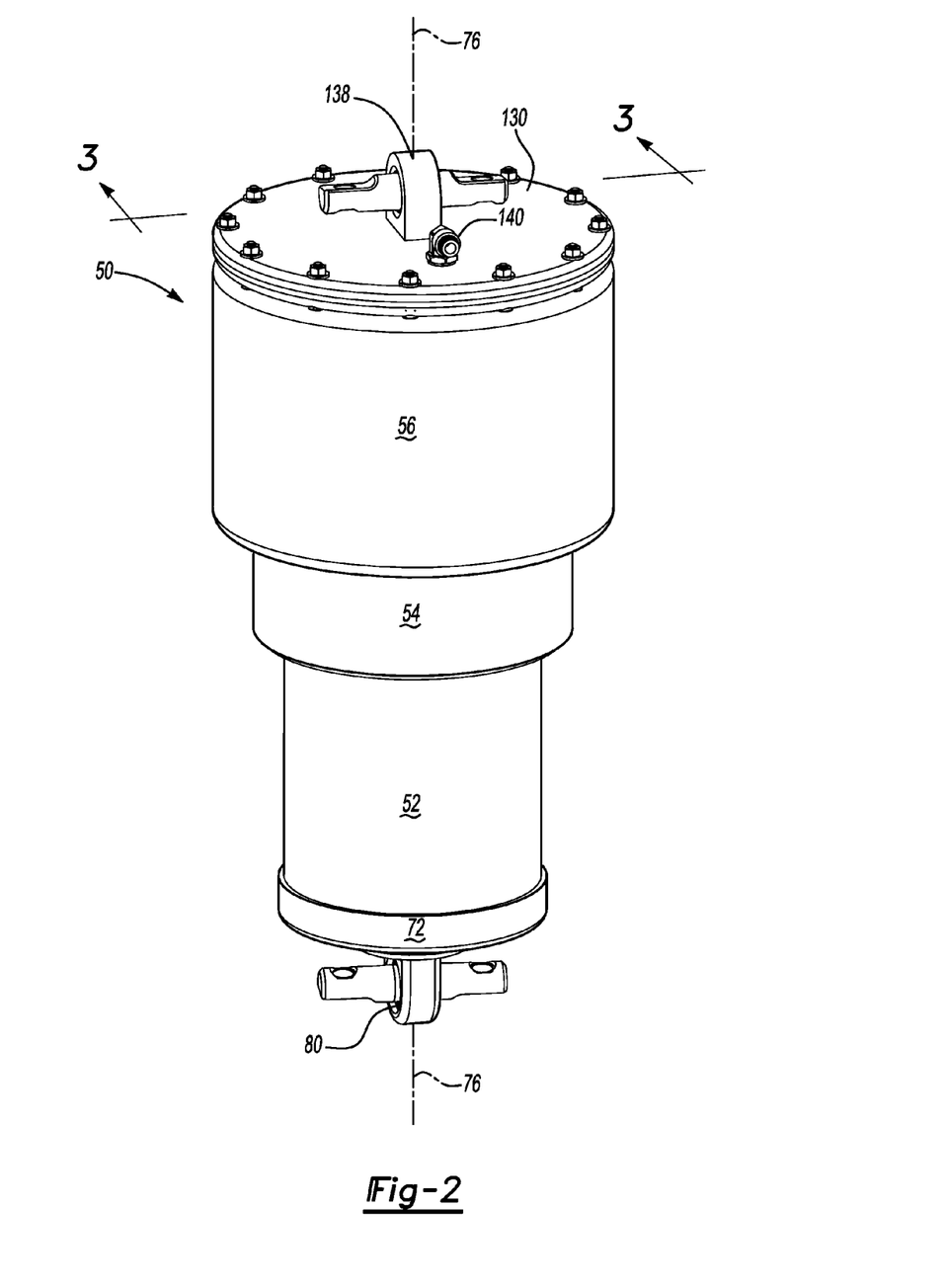
FIG. 2 is a perspective view of a first embodiment of an air-air strut.

The vehicle suspension system 18 may interconnect a wheel assembly 12 and/or wheel axle 24 to a vehicle chassis to dampen vibrations, provide a desired level of ride quality, and to control vehicle ride height or the distance between the vehicle chassis and the ground. The vehicle suspension system 18 may include one or more air-air struts 50. An example of an air-air strut 50 is shown in FIG. 2. An air-air strut 50 may be fluidly coupled to the pressurized gas supply system 14. In at least one embodiment, an air-air strut 50 may include an air cylinder 52, an air spring piston 54, and an air spring 56.

Referring to FIGS. 2 and 3, the air cylinder 52 may be provided to control vehicle ride height and/or adjust the spring rate of the air-air strut 50. The air cylinder 52 may include a housing assembly 60, a piston rod 62, and a piston 64. Spring rate may be the amount of weight required to deflect a spring or spring characteristics of the air-air strut 50 by a predetermined distance. A lower spring rate may provide a "softer" spring and may be perceived as providing a smoother ride.

The housing assembly 60 may be configured to be mounted to a first vehicle component 66, such as a lower control arm that may couple the wheel assembly 12 and/or wheel axle 24 to the chassis, frame, or other structural member. The housing assembly 60 may include a plurality of components. In at least one embodiment, the housing assembly 60 may include a body 70, a first end cap 72, and a second end cap 74.

The body 70 may have any suitable configuration. In the embodiment shown, the body 70 is configured as a generally cylindrical tube that extends along an axis 76. The body 70 may at least partially define a cavity 78 and may be made of any suitable material, such as a metal or metal alloy.

The first end cap 72 may be disposed proximate a first end of the body 70. The first end cap 72 may include a first mounting feature 80 that may facilitate mounting of the air cylinder 52 to the first vehicle component 66. In at least one embodiment, the first end cap 72 may include a first port 82. The first port 82 may be fluidly connected to the pressurized gas supply system 14 via the first valve 34. The first port 82 may also include a passage that extends through the body 70 in one or more embodiments.

The second end cap 74 may be disposed proximate a second end of the body 70 and may be disposed opposite the first end cap 72. The second end cap 74 may at least partially define the cavity 78 and may include a hole 84 that may receive the piston rod 62 and may be disposed along the axis 76. In addition, the second end cap 74 may include a second port 86. The second port 86 may not be fluidly coupled to the pressurized gas supply system 14 and may facilitate receiving and venting of air from the air cylinder 52 as will be described in more detail below. A groove 88 may be provided on an exterior surface of the second end cap 74 to provide a flow path or air passage between the second port 86 and the air spring piston 54.

Figure 6:
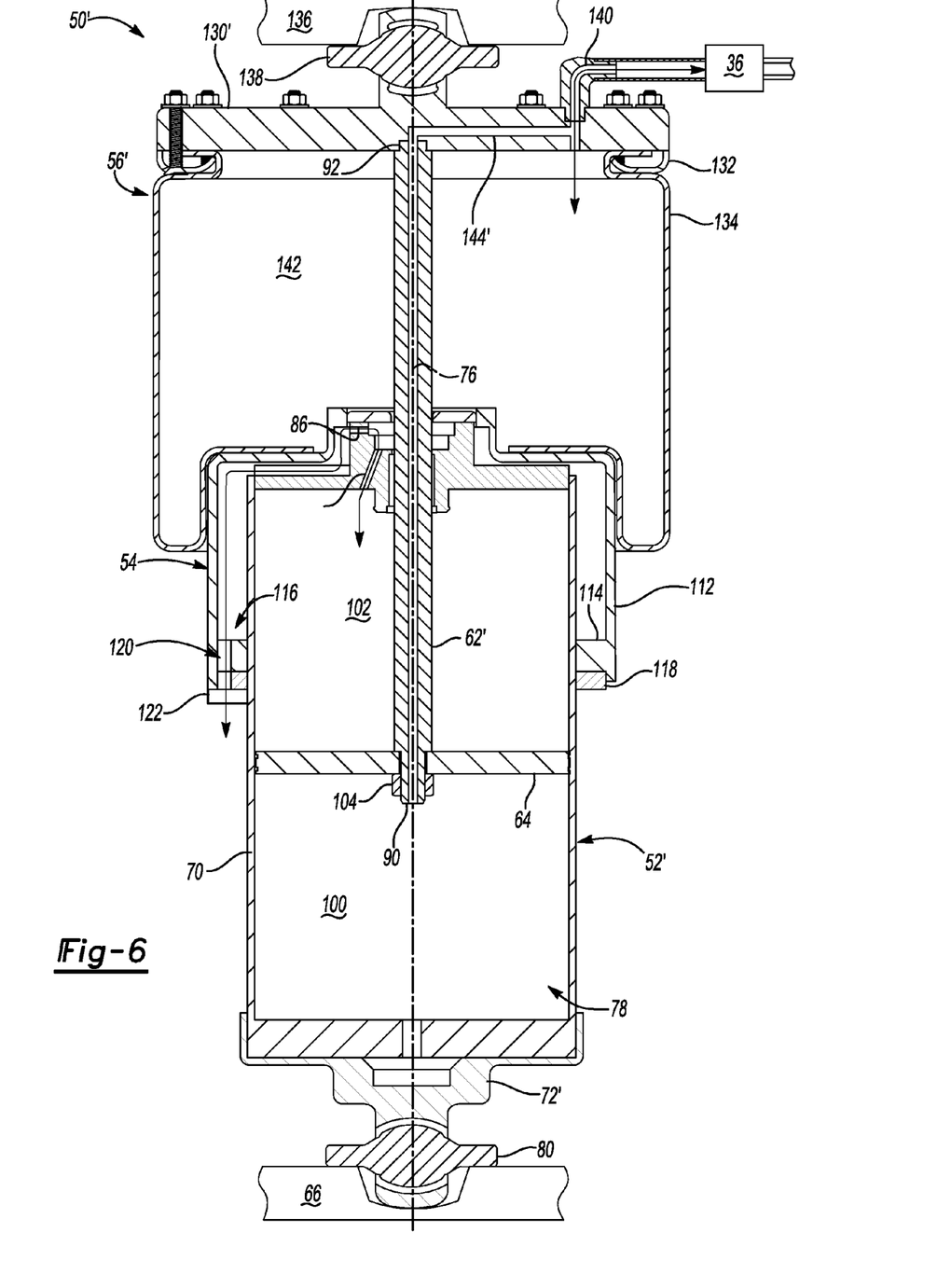
FIG. 6 is a section view of a second embodiment of an air-air strut.

The piston rod 62 may be configured to move with respect to the housing assembly 60. In at least one embodiment, the piston rod 62 may extend along the axis 76 and may have a first end 90 and a second end 92. The first end 90 may be disposed in the cavity 78. The second end 92 may be disposed opposite the first end 90 and may be located proximate the air spring 56 as will be discussed in more detail below. In at least one embodiment, the piston rod 62 may be provided as a cylindrical tube that may be solid as shown in FIG. 3 or may be hollow as shown in FIG. 6.

The piston 64 may be disposed in the cavity 78 and may engage the body 70 to separate the cavity 78 into a first chamber 100 and a second chamber 102. The first chamber 100 may be disposed between the piston 64 and the first end cap 72. In the embodiment shown in FIG. 3, pressurized gas may be provided to the first chamber 100 via the first port 82. The second chamber 102 may be disposed between the piston 64 and the second end cap 74. As such, the piston 64 may inhibit air from passing between the first chamber 100 and the second chamber 102. The piston 64 may be fixedly disposed on the piston rod 62. Accordingly, the piston 64 may move within the cavity 78 with the piston rod 62, thereby changing the volume of the first and second chambers 100, 102. The piston 64 may be secured to the piston rod 62 in any suitable manner. In at least one embodiment, the piston 64 may include a through hole through which the first end 90 of the piston rod 62 may extend. A fastener 104, such as a nut, may be provided to secure the piston 64 to the piston rod 62.

The air spring piston 54 may be fixedly disposed on the air cylinder 52. For example, the air spring piston 54 may be fixedly disposed on the housing assembly 60 of the air cylinder 52 proximate the second end cap 74. In at least one embodiment, the air spring piston 54 may include a first wall 110, a second wall 112, a third wall 114, and an air passage 116.

The first wall 110 may be fixedly positioned with respect to the air cylinder 52 and may be disposed adjacent to the air spring 56. The first wall 110 may include a hole through which the piston rod 62 extends. In at least one embodiment, the first wall 110 may be spaced apart from and extend away from the axis 76. In addition, the first wall 110 may extend further away from the axis 76 than the body 70 and/or second end cap 74 of the housing assembly 60 of the air cylinder 52 to provide a larger effective diameter for exerting force upon the air spring 56.

The second wall 112 may extend from the first wall 110 to the third wall 114. The second wall 112 may define an outside circumference of the air spring piston 54.

The third wall 114 may be spaced apart from the first wall 110 and may extend from the second wall 112 toward the body 70 of the of the air cylinder 52. In at least one embodiment, the third wall 114 may engage a mounting ring 118. The mounting ring 118 may be fixedly disposed on the air cylinder 52. For example, the mounting ring 118 may be configured as a ring that extends around the body 70 of the air cylinder 52 and may be located between the first end cap 72 and the second end cap 74. The third wall 114 may also include an opening 120 that may be part of or connected to the air passage 116. Optionally, a restriction device 122, such as a filter and/or poppet valve, may be disposed proximate the opening 120 to inhibit water from entering the air passage 116.

The air passage 116 may be disposed in the air spring piston 54. The air passage 116 may permit air to flow between the second chamber 102 of the air cylinder 52 and the surrounding environment. For instance, air may flow through the opening 120, air passage 116, and the second port 86 of the second end cap 74 to the second chamber 102 when the piston 64 is actuated away from the second end cap 74 to increase the volume of the second chamber 102. Air may flow in the opposite direction when the piston 64 is actuated toward the second end cap 74 to decrease the volume of the second chamber 102. The air passage 116 may be at least partially defined by the first wall 110, second wall 112, third wall 114, and/or body 70 of the air cylinder 52 in one or more embodiments.

The air spring 56 may be disposed adjacent to the air spring piston 54. In at least one embodiment, the air spring 56 may include an end plate 130, a bead ring 132, and a flexible bellows 134.

The end plate 130 may be disposed at an end of the air-air strut 50 that may be located opposite the first end cap 72 of the air cylinder 52. The end plate 130 may be configured to be mounted to a second vehicle component 136 that differs from the first vehicle component 66. For example, the end plate 130 may be configured to be mounted to the chassis of the vehicle 10. The end plate 130 may include a second mounting feature 138 that may facilitate mounting of the air spring 56 to the second vehicle component 136. The end plate 130 may include at least one air spring port 140. In the embodiment shown, the air spring port 140 may be fluidly connected to the pressurized gas supply system 14 via the second valve 36. In addition, a fitting may be provided with or adjacent to the air spring port 140 to facilitate coupling to the pressurized gas supply system 14. The end plate 130 may also be interconnected with the air cylinder 52. For instance, the end plate 130 may engage or receive the second end 92 of the piston rod 62. Alternatively, a spring or spacer may be disposed between the end plate 130 and the second end 92 of the piston rod 62 in one or more embodiments. Either configuration may allow the second end 92 of the piston rod 62 to exert or transmit force to the end plate 130.

The bead ring 132 may be provided to facilitate coupling of the flexible bellows 134 to the end plate 130. The bead ring 132 may be fixedly mounted to and may extend around the perimeter of the end plate 130. An end of the flexible bellows 134 may be received between the bead ring 132 and the end plate 130 to inhibit air leakage between the flexible bellows 134 and the end plate 130.

The flexible bellows 134 may extend from the end plate 130 to the air spring piston 54. For example, an end of the flexible bellows 134 that is located opposite the end plate 130 may include an opening through which the piston rod 62 and optionally a portion of the second end cap 74 may extend. In addition, this end of the flexible bellows 134 may engage the air spring piston 54 or may be configured such that a seal is formed. As such, the flexible bellows 134 may cooperate with the air spring piston 54 and the end plate 130 to at least partially define an air spring chamber 142. The air spring chamber 142 may be fluidly connected to the pressurized gas supply system 14 via the air spring port 140. For instance, pressurized gas may flow from the pressurized gas supply system 14 through the air spring port 140 and into the air spring chamber 142 to increase the volume of pressurized gas in the air spring chamber 142. Similarly, pressurized gas may flow from the air spring chamber 142 through the air spring port 140 and may be vented to reduce the volume of pressurized gas in the air spring chamber 142.

Figure 4:
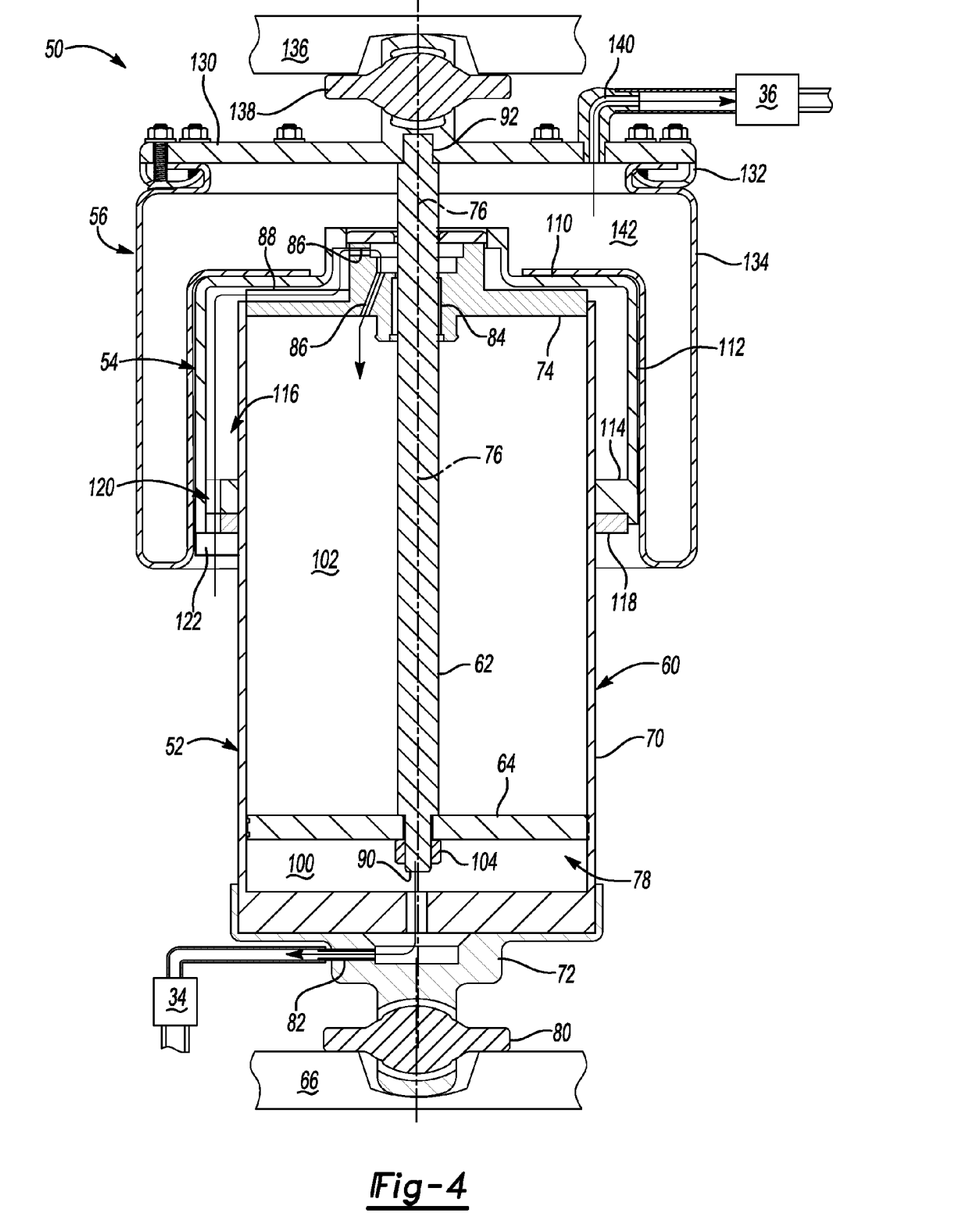
Figure 5:
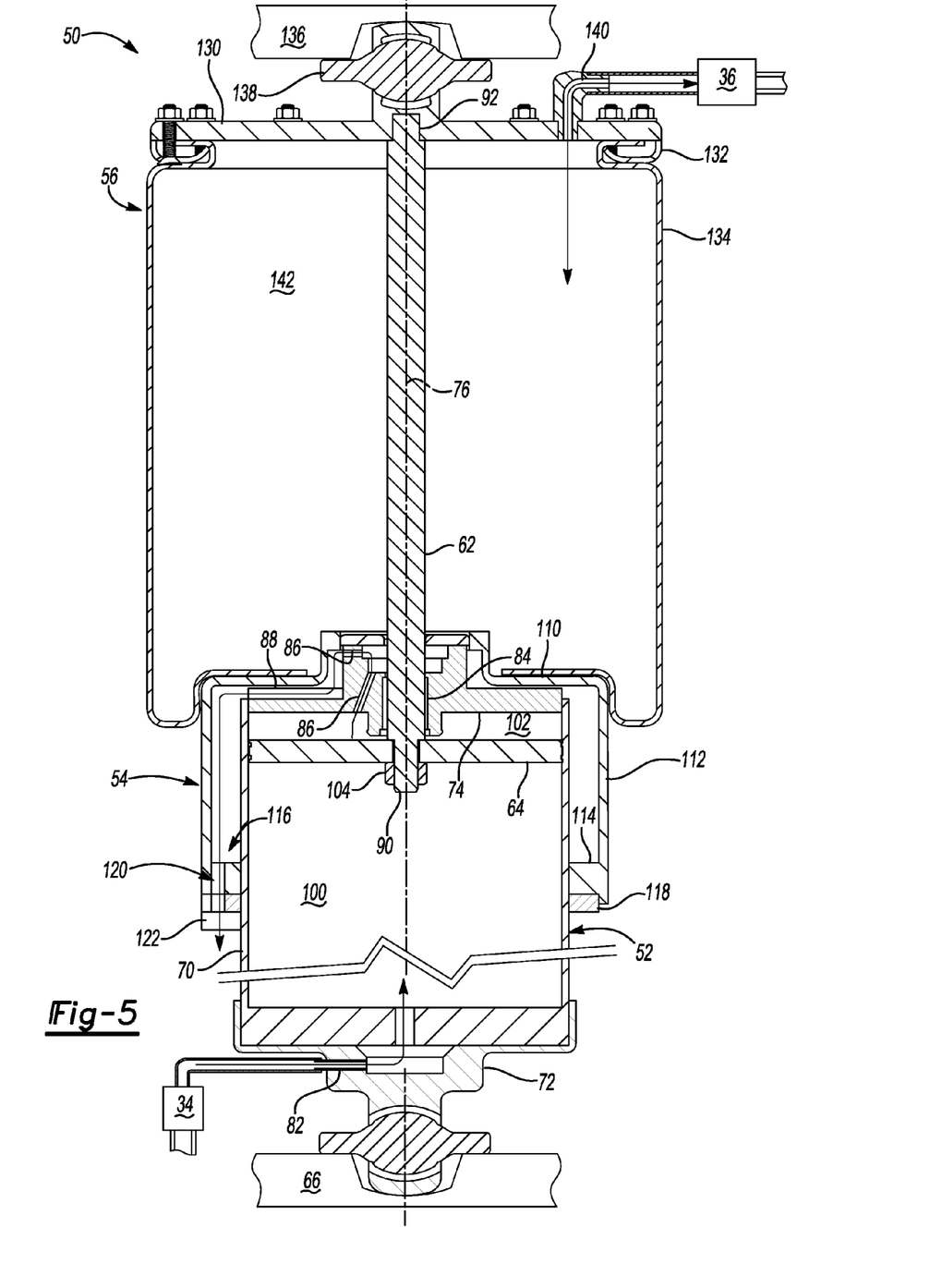

Referring to FIGS. 3-5, the air-air strut 50 is shown in various positions.

In FIG. 3, the air-air strut 50 is shown in an exemplary first position in which the air cylinder 52 is disposed in approximately the midpoint of its range of travel.

In FIG. 4, the air-air strut 50 is shown in a second position or retracted position in which the air cylinder 52 is disposed closer to the end plate 130 of the air spring 56. Vehicle ride height, or the distance between the first and second vehicle components 66, 136 may be reduced in this position as compared to the first position. The air-air strut 50 may be actuated from the first position to the second position by actuating the first valve 34 to vent pressurized gas from the first chamber 100 via the first port 82. The venting of pressurized gas from the first chamber 100 reduces the force available to counteract the weight of the vehicle 10 exerted upon the second vehicle component 136. As such, the weight of the vehicle 10 may then actuate the piston rod 62 and piston 64 toward the first end cap 72. Movement of the piston 64 may create suction that pulls air into the second chamber 102 via the opening 120, air passage 116, groove 88, and the second port 86.

In FIG. 5, the air-air strut 50 is shown in a third position or extended position in which the air cylinder 52 is positioned further away from the end plate 130 of the air spring 56. Vehicle ride height, or the distance between the first and second vehicle components 66, 136 may be increased in this position as compared to the first and second positions. The air-air strut 50 may be actuated from the first or second positions to the third position by actuating the first valve 34 to provide pressurized gas from the pressurized gas supply system 14 to the first chamber 100 via the first port 82. Providing pressurized gas to the first chamber 100 increases the volume of gas and/or force available to counteract the weight of the vehicle 10. As such, the pressurized gas in the first chamber 100 may actuate the piston rod 62 and piston 64 away from the first end cap 72, thereby reducing the volume of the second chamber 102 and forcing air out of the second chamber 102 via the second port 86 and the air passage 116.

In FIGS. 3-5, the volume of pressurized gas may also be changed by operation of the second valve 36. For example, second valve 36 may be positioned to allow pressurized gas to flow from the pressurized gas supply system 14 to the air spring chamber 142 via the air spring port 140 to increase the volume of pressurized gas. Similarly, the second valve 36 may be positioned to allow pressurized gas to be vented from the air spring chamber 142 via the air spring port 140 to reduce the volume of pressurized gas. In addition, the second valve 36 may be closed to maintain the volume of pressurized gas in the air spring chamber 142.

Referring to FIG. 6, a second embodiment of an air-air strut 50' is shown. In this embodiment, the air cylinder 52' and air spring 56' are modified as compared to the embodiment in FIGS. 3-5. The air cylinder 52' is modified such that the first port 82 is deleted from the first end cap 72' and at least partially incorporated with the piston rod 62'. More specifically, the piston rod 62' may be hollow or include a bore that extends from the first end 90 to the second end 92. The air spring 56' is modified to provide a connector air passage 144' that fluidly connects the first port 82 to the air spring port 140. The connector air passage 144' may be provided in the end plate 130'. As such, a single valve may be used to control the flow of air to and from the first chamber 100 of the air cylinder 52 and the air spring chamber 142 of the air spring 56'.

Figure 7:
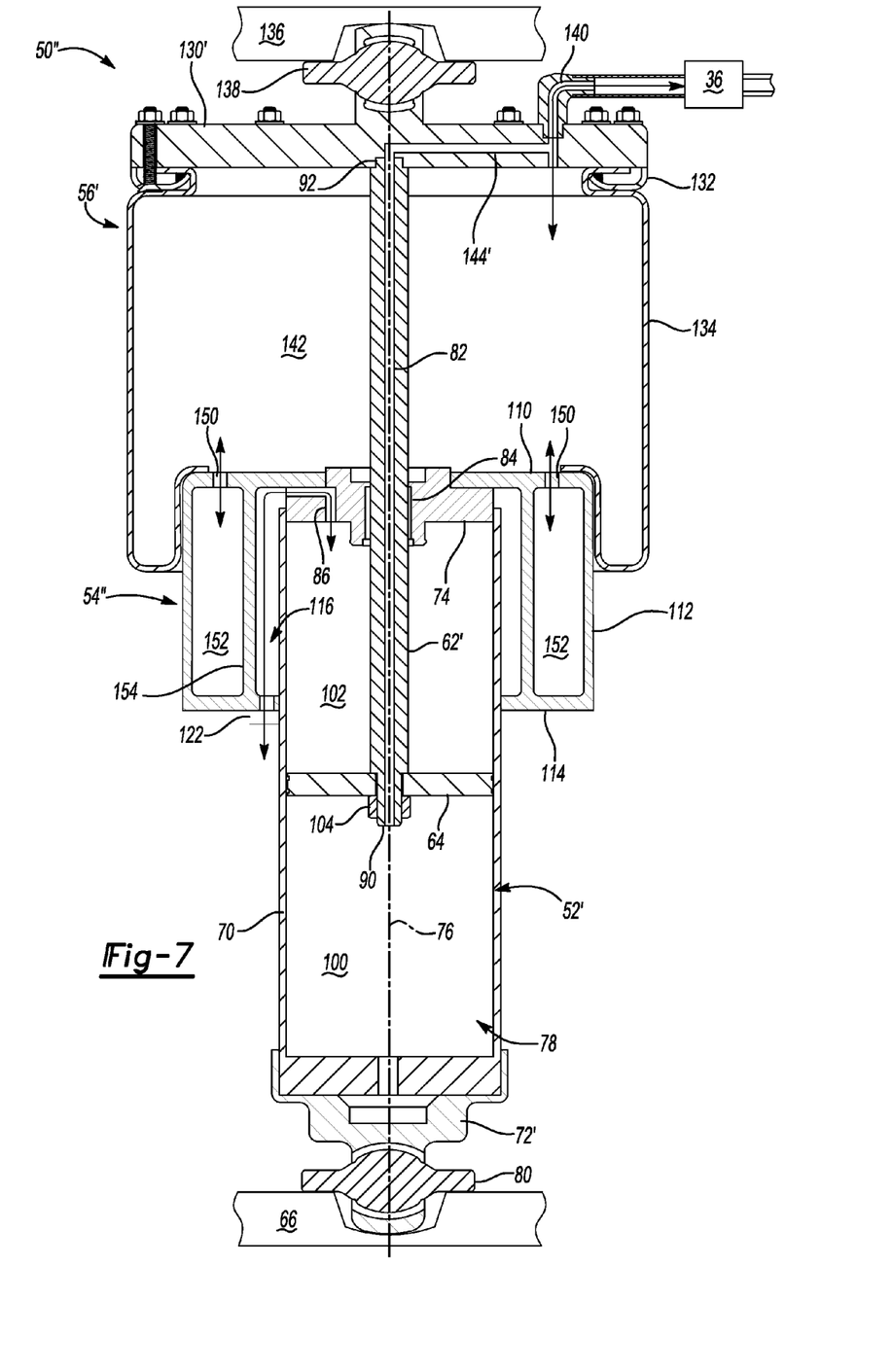
FIG. 7 is a section view of a third embodiment of an air-air strut.

Referring to FIG. 7, a third embodiment of an air-air strut 50" is shown. This embodiment may modify the air cylinder piston 54 shown in any of the previous embodiments. More specifically, the air cylinder piston 54" may include one or more bleed holes 150 and a reservoir chamber 152. One or more bleed holes 150 may be provided in the first wall 110 to fluidly couple the air spring chamber 142 to the reservoir chamber 152. The reservoir chamber 152 may be defined within the air cylinder piston 54" and may have a defined volume. In at least one embodiment, the reservoir chamber 152 may be disposed adjacent to the first, second and third walls 110 112, 114 and may be spaced apart from the air passage 116 by a divider wall 154. As such, the reservoir chamber 152 may cooperate with the bleed holes 150 to permit some volume of the pressurized air in the air spring chamber 142 to bleed into the reservoir chamber 152 to provide a lower spring rate with additional air volume that may be compressed without interfering with operation of the air cylinder 52' and the flow of air through the air passage 116. One or more bleed holes 150 and reservoir chambers 152 may be provided with other embodiments, such as that shown in FIGS. 3-5.

Figure 8:
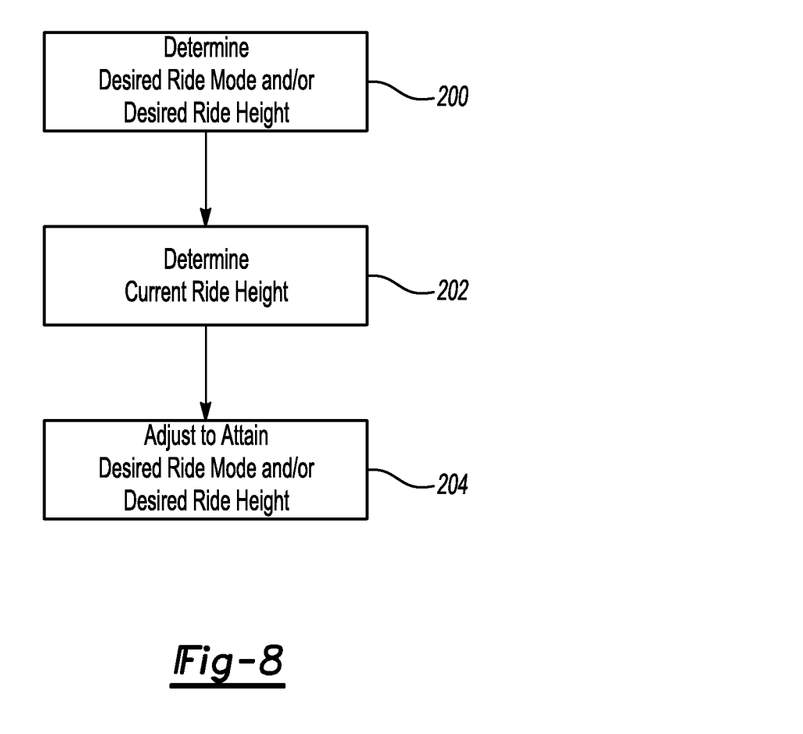
FIG. 8 is a flowchart of an exemplary method of control of a vehicle suspension system.

Referring to FIG. 8, a flowchart of an exemplary method of control of a vehicle suspension system 18 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope intended.

In at least one embodiment, the method may be executed by the control system 16 and may be implemented as a closed loop control system. Moreover, the method may be enabled or disabled based the operating state of the vehicle 10. For example, the method or control logic may be enabled when the vehicle ignition is turned on, the engine is running, or the vehicle is in motion in one or more embodiments.

At 200, the method determines a desired ride mode and/or a desired ride height. Determination or selection of a desired ride mode and/or a desired ride height may be based on an input from a vehicle operator. Such an input may be provided using the communication device 42. For instance, one or more predetermined or preprogrammed ride modes may be selected by an operator. Each ride mode may be associated with different suspension performance characteristics, such as different spring rates for one or more air-air struts 50 and/or different ride height settings. Exemplary ride modes may include an on-road ride mode an off-road ride mode. An on-road ride mode may provide a stiffer spring rate than an off-road mode to accommodate terrain differences. A specific ride height setting or ride height may be associated with a particular ride mode. For instance, a higher ride height may be associated with an off-road ride mode than is associated with an on-road ride mode to provide increased ground clearance. In at least one embodiment, multiple ride height settings may be selected by a vehicle operator. Exemplary ride height settings may include a standup position ride height, an off-road ride height, an on-road ride height, and a kneel position ride height. The vehicle suspension system may provide a maximum ride height in the standup position to facilitate maintenance. The off-road ride height may be less than the standup position ride height but greater than the on-road ride height. The kneel position ride height may be less than the on-road ride height and may lower the suspension system to a lowest ride height. In at least one embodiment, the ride height may be adjusted within a range rather than selecting a predetermined ride height setting or mode. The range of ride heights provided may be a function of the geometry and characteristics of the air-air strut 50. In an exemplary embodiment, the range of ride heights may be adjusted by at least 15 inches.

At 202, a current vehicle ride height is determined. The current vehicle ride height may be based on a signal from the ride height sensor 40.

At 204, the vehicle suspension system 18 may be adjusted to attain the desired ride mode and/or desired ride height.

The standup position ride height may be attained by opening the first valve 34 to provide pressurized gas from the pressurized gas supply system 14 at a predetermined pressure, such as line pressure, to the first chamber 100 of the air cylinder 52 to extend the piston rod 62. In addition, the second valve 36 may be opened to provide pressurized gas from the pressurized gas supply system 14 at a predetermined pressure, such as line pressure, to the air spring chamber 142 of the air spring 56 and actuate the second vehicle component 136 away from the first vehicle component 66.

The kneel position ride height may be attained by actuating the first and second valves 34, 36 to vent pressurized gas from the first chamber 100 of the air cylinder 52 to retract the piston rod 62 and/or the air spring chamber 142 of the air spring 56 and actuate the second vehicle component 136 toward the first vehicle component 66.

In the on-road ride mode, pressurized gas may be provided by the pressurized gas supply system 14 to the first chamber 100 of the air cylinder 52 at a predetermined pressure, such as line pressure, while the air spring 56 may be used to control ride height. The on-road ride height setting may be attained by comparing the current or detected ride height to the desired ride height that is selected or associated with the on-road ride mode. For example, if the current ride height is greater than the desired ride height, then the second valve 36 may be actuated to exhaust air from the air spring chamber 142 of the air spring 56 until the desired ride height is obtained. Similarly, if the current ride height is less than the desired ride height, then the second valve 36 may be actuated to provide air from the pressurized gas supply system 14 to the air spring chamber 142 of the air spring 56 until the desired right height is obtained. Once the current ride height is equal to the desired ride height or within a predetermined range of the desired ride height, then the second valve 36 may be closed. A determination as to whether the desired ride height is attained may be based on the signal from the ride height sensor 40.

In the off-road ride mode, pressurized gas may be provided by the pressurized gas supply system 14 to the air spring chamber 142 of the air spring 56 at a predetermined pressure, such as line pressure, while the air cylinder 52 may be used to control ride height. The off-road ride height setting may be attained by comparing the current or detected ride height to the desired ride height that is selected or associated with the off-road ride mode. For example, if the current ride height is greater than the desired ride height, then the first valve 34 may be actuated to exhaust air from the first chamber 100 of the air cylinder 52 until the desired ride height is obtained. Similarly, if the current ride height is less than the desired ride height, then the first valve 34 may be actuated to provide air from the pressurized gas supply system 14 to the first chamber 100 of the air cylinder 52 until the desired right height is obtained. Once the current ride height is equal to the desired ride height or within a predetermined range of the desired ride height, then the first valve 34 may be closed. A determination as to whether the desired ride height is attained may be based on the signal from the ride height sensor 40.

The air-air strut described above may provide a greater range of travel as compared to embodiments in which a mechanical spring is located inside of the air spring, such as a coil spring disposed around a piston rod. In addition, the air-air strut may provide reduced package space, such as when the air-air strut is in a kneel position, since the air spring does not need to provide space to accommodate a collapsed mechanical spring. In addition, an air-air strut may provide more force capacity across the entire stroke as compared to other suspension systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle suspension system comprising:
    an air cylinder having:
        a housing assembly that at least partially defines a cavity and that is configured to be mounted to a first vehicle component,
        a piston rod that is moveably disposed in the cavity, the piston rod having a first end disposed in the cavity and a second end disposed opposite the first end, and
        a piston that is fixedly disposed on the piston rod and that separates the cavity into a first chamber and a second chamber, wherein the first and second chambers have first and second ports that permit air to enter and exit the first and second chambers, respectively;
    an air spring piston that is fixedly disposed on the air cylinder and that has an air passage that is fluidly connected to the second port; and
    an air spring having:
        an end plate that is configured to be mounted to a second vehicle component and that has an air spring port, wherein the second end of the piston rod is disposed proximate the end plate, and
        a flexible bellows that extends from the end plate to the air spring piston to at least partially define an air spring chamber, wherein the air spring port permits air to enter and exit the air spring chamber;
    wherein air is provided to the first chamber via the first port and exhausted from the second chamber to a surrounding environment outside the air cylinder via the second port and the air passage to increase a distance between the air spring piston and the end plate.

2. The vehicle suspension system of claim 1 wherein air enters the second chamber via the air passage and the second port and air is exhausted from the first chamber via the first port to decrease the distance between the air spring piston and the end plate.

3. The vehicle suspension system of claim 1 wherein the second end of the piston rod engages the end plate.

4. The vehicle suspension system of claim 1 wherein the first port extends through the housing assembly.

5. The vehicle suspension system of claim 1 wherein the air spring chamber is separated from the air passage by the air spring piston.

6. The vehicle suspension system of claim 1 further comprising a first valve that controls airflow through the first port and a second valve that controls airflow through the air spring port.

7. The vehicle suspension system of claim 1 further comprising a mounting ring that is fixedly disposed on an exterior surface of the housing assembly, wherein the mounting ring engages the air spring piston.

8. The vehicle suspension system of claim 7 wherein the air spring piston further comprises a first wall that engages the flexible bellows, a second wall that extends from the first wall, and a third wall that extends from the second wall and that engages the mounting ring.

9. The vehicle suspension system of claim 8 wherein the first wall is spaced apart from the third wall.

10. The vehicle suspension system of claim 8 wherein the third wall includes an opening that is part of the air passage.

11. The vehicle suspension system of claim 10 further comprising a restriction device disposed proximate the opening to inhibit water from entering the air passage.

12. The vehicle suspension system of claim 1 wherein the housing assembly includes a first end cap and a second end cap disposed opposite the first end cap.

13. The vehicle suspension system of claim 12 wherein the second end cap includes a hole that receives the piston rod.

14. The vehicle suspension system of claim 12 wherein the second port is part of the second end cap.

15. The vehicle suspension system of claim 13 wherein the second end cap includes a groove that provides a flow path between the second port and the air spring piston.

16. The vehicle suspension system of claim 15 wherein the groove is provided on an exterior surface of the second end cap.

17. The vehicle suspension system of claim 8 wherein the housing assembly further comprises a body that extends from a first end cap to a second end cap.

18. The vehicle suspension system of claim 17 wherein the mounting ring is disposed on the body.

19. The vehicle suspension system of claim 17 wherein the third wall extends from the second wall to the body.

20. The vehicle suspension system of claim 1 wherein the second port is not blocked throughout a range of travel of the piston.

21. The vehicle suspension system of claim 1 wherein the piston does not have openings that permit air to flow through the piston between the first and second chambers.

\* \* \* \* \*